(12) United States Patent
Cleland (10) Patent No.: US 8,497,043 B2
(45) Date of Patent: Jul. 30, 2013

(54) ELECTRICAL POWER GENERATOR SYSTEMS THAT PASSIVELY TRANSFER HYDROGEN AND OXYGEN TO FUEL CELLS AND METHODS FOR GENERATING POWER VIA SAME

(75) Inventor: John G. Cleland, Cary, NC (US)

(73) Assignee: MIL3 Inc., Cary, NC (US)

( * ) Notice: Subject to any disclaimer, the term of this patent is extended or adjusted under 35 U.S.C. 154(b) by 252 days.

(21) Appl. No.: 12/933,810

(22) PCT Filed: Mar. 13, 2009

(86) PCT No.: PCT/US2009/001595
§ 371 (c)(1),
(2), (4) Date: Sep. 21, 2010

(87) PCT Pub. No.: WO2009/120266
PCT Pub. Date: Oct. 1, 2009

(65) Prior Publication Data
US 2011/0039169 A1 Feb. 17, 2011

Related U.S. Application Data

(60) Provisional application No. 61/039,602, filed on Mar. 26, 2008.

(51) Int. Cl.
*H01M 8/06* (2006.01)
(52) U.S. Cl.
USPC ........... 429/421; 429/408; 429/416; 429/437; 48/61; 48/116; 48/117

(58) Field of Classification Search
USPC .............. 429/408, 416, 421, 437; 48/61, 116, 48/117
See application file for complete search history.

(56) References Cited

U.S. PATENT DOCUMENTS

| | | | | |
|---|---|---|---|---|
| 2,328,140 A | * | 8/1943 | Hahn | 564/450 |
| 2,623,812 A | * | 12/1952 | Eborall et al. | 423/658 |
| 4,761,209 A | * | 8/1988 | Bonaventura et al. | 205/633 |
| 5,372,617 A | * | 12/1994 | Kerrebrock et al. | 48/61 |
| 7,425,380 B2 | | 9/2008 | Matoba et al. | |
| 2003/0116321 A1 | * | 6/2003 | Zhang et al. | 166/335 |
| 2004/0247959 A1 | | 12/2004 | Kimbara et al. | |
| 2005/0284022 A1 | | 12/2005 | Lim | |

FOREIGN PATENT DOCUMENTS
WO WO 98-29917 A1 7/1998

* cited by examiner

*Primary Examiner* — Zachary Best
(74) *Attorney, Agent, or Firm* — Myers Bigel Sibley & Sajovec, P.A.

(57) ABSTRACT

A power generating system for operating below a surface of a body of water includes a fuel cell stack configured to react hydrogen and oxygen to produce electricity. An oxygen source is configured to provide oxygen to the fuel cell stack. A hydrogen source is configured to provide hydrogen to the fuel cell stack. The hydrogen source is at least partially submerged in water and incorporates a non-hydride metal alloy that reacts with water to produce hydrogen from the water.

26 Claims, 4 Drawing Sheets

ELECTRICAL POWER GENERATOR SYSTEMS THAT PASSIVELY TRANSFER HYDROGEN AND OXYGEN TO FUEL CELLS AND METHODS FOR GENERATING POWER VIA SAME

RELATED APPLICATIONS

The present application is a 35 U.S.C. §371 national phase application of PCT International Application No. PCT/US09/01595 having an international filing date of Mar. 13, 2009, claiming priority to U.S. Provisional Patent Application No. 61/039,602, filed Mar. 26, 2008. The disclosures of each application are incorporated herein by reference in their entireties. The above PCT International Application was published in the English language as International Publication No. WO 2009/120266 A1.

FIELD OF THE INVENTION

The present invention relates to electrical power sources, and more particularly, to power sources for use in remote environments that passively transfer hydrogen and oxygen to fuel cells.

BACKGROUND

Small electrical power sources may be useful for remote applications where conventional power from the AC electrical grid is not available. For example, in the marine environment, auxiliary power in the range from 20 to 400 watts can be useful for emergency situations, lifeboats, buoys, battery charging, auxiliary lighting, powering sensors, communications and signaling, propulsion, other mechanical functions, submerged operations, and heating and cooling.

SUMMARY

According to some embodiments of the present invention, a power generating system for operating below a surface of a body of water includes a fuel cell stack configured to react hydrogen and oxygen to produce electricity. An oxygen source is configured to provide oxygen to the fuel cell stack. A hydrogen source is configured to provide hydrogen to the fuel cell stack. The hydrogen source is at least partially submerged in water and incorporates a non-hydride metal alloy that reacts with water to produce hydrogen from the water. The reaction is catalyzed by a naturally occurring salt in the water, and the metal alloy is contained in a reactor volume that allows unassisted entry of surrounding water, such that hydrogen gas produced in the reactor volume supplies the fuel cell stack at a hydrostatic pressure representing a depth of water contacting the metal alloy. A hydrogen volume defines a reactor water level and an amount of alloy surface being wetted by water to control a rate of hydrogen generation to meet a rate of hydrogen consumption by the fuel cell stack in response to an electrical load demand. The oxygen source provides oxygen to the fuel cell stack below the surface and includes air flow from above the water surface, a portion of submerged air suitable for human breathing, and/or dissolved oxygen recovered from the surrounding water. The fuel cell stack operates below the water surface and dissociates hydrogen from the hydrogen source at an anode side of the fuel cell stack into protons and electrons to produce an electric current, and the fuel cell stack recombines the hydrogen with dissociated oxygen from the oxygen source on a cathode side by reaction in a presence of an electrolyte to produce water and heat. The fuel cell stack is cooled by heat conduction paths from high temperature regions of the fuel cell stack to the water surrounding the system.

In some embodiments, the metal alloy includes a magnesium or aluminum base alloyed with nickel of more than 0.1% and less than 7% to provide a sufficient reaction rate to meet a fuel cell stack hydrogen demand.

In some embodiments, the metal alloy is storable in air for more than two years with less than 1% degradation of hydrogen generation capability.

In some embodiments, the metal alloy includes one or more castings, each casting being removably replaceable. The castings may be configured to provide a sufficient reaction surface area to provide hydrogen to meet a fuel cell stack hydrogen demand without more than 5% loss of hydrogen to the surrounding water.

In some embodiments, the hydrogen volume provides sufficient space above the metal alloy to substantially prevent water entrainment and gas/water bubbles transport to the fuel cell stack, and the hydrogen volume provides sufficient space below the metal alloy to substantially inhibit a loss of hydrogen to the surrounding water.

In some embodiments, the catalyzing salt is either naturally occurring in the water in a marine environment, or is dispersed in the metal alloy in an amount of not less than 3% by weight.

In some embodiments, the system is configured such that the total buoyancy of the system varies by less than about 40% during a complete reaction of the metal alloy.

In some embodiments, a portion of the hydrogen produced or separate air forced from the reactor volume by immersion in the water is stored in a flotation volume to thereby increase a buoyancy in the water.

In some embodiments, the oxygen source is configured to provide air to the fuel cell stack by free convection induced by heat from the fuel cell stack. The system can include a filter and/or float valve configured to substantially prevent water from entering the fuel cell stack.

In some embodiments, the oxygen source is configured to provide air to the fuel cell stack from lung exhaust from a person breathing, the system further comprising a filter, float valve and/or relief valve configured to substantially prevent water from entering the fuel cell stack.

In some embodiments, the oxygen source is configured to provide air to the fuel cell stack from a portion of air also available for breathing by persons submerged below the water surface. The oxygen source can include lung exhaust from a self contained underwater breathing apparatus (SCUBA).

In some embodiments, the oxygen source is configured to provide oxygen to the fuel cell stack using a hydrophobic microporous hollow fiber membrane or a gas-liquid contactor which allows gas but not liquid to pass through, to recover dissolved oxygen from the surrounding water while utilizing an internal process vacuum induced by oxygen consumption of the fuel cell stack.

In some embodiments, the oxygen source is configured to move air to the fuel cell stack using a means for cooling the fuel cell stack supplemental to a cooling provided by the surrounding water. The system can include a filter and/or float valve for substantially preventing water droplets from entering to the fuel cell stack.

In some embodiments, the fuel cell stack includes a hydrogen gas channel inlet, oxygen and/or air gas channel inlets and a plurality of fuel cells that include a proton-conducting polymer electrolyte membrane between the anode side and the cathode side, with hydrogen and oxygen reactions at catalyst surfaces, and with heat transfer provided near the gas channel inlets.

In some embodiments, the fuel cell stack outputs a potable water product.

In some embodiments, hydrogen and oxygen are provided to the fuel cell stack in the absence of active pressure or flow controls, valves and/or regulators.

In some embodiments, the system includes a floating buoy structure. The system can be connected to a submerged application platform or user. The system can include a connection line that is configured to transport gas and/or liquid to and/or from the system.

In some embodiments, heat from the fuel cell stack and/or from the metal alloy is transferred to the surrounding water and is utilized for warming a person in the water, for attracting fish in cold water, for inducing mechanical motion, and/or for warming to increase oxygen migration through the hydrophobic microporous hollow fiber membrane.

In some embodiments, the water is sea water and the catalyzing salt in the water is a naturally occurring sea salt.

In some embodiments, the fuel cell stack comprises a planar fuel cell configuration having a plurality of planar cells arranged side-by-side substantially parallel to adjacent cells.

According to further embodiments of the present invention, power generating methods for operating below a surface of a body of water use a system having a fuel cell stack configured to react hydrogen and oxygen to produce electricity, an oxygen source configured to provide oxygen to the fuel cell stack, and a hydrogen source configured to provide hydrogen to the fuel cell stack. The method includes submerging the hydrogen source at least partially in water. The hydrogen source including a non-hydride metal alloy is reacted with water to produce hydrogen from the water. The reaction is catalyzed by a naturally occurring salt, and the metal alloy is contained in a reactor volume that allows unassisted entry of surrounding water such that hydrogen gas produced in the reactor volume supplies the fuel cell stack at a hydrostatic pressure representing a depth of water contacting the metal alloy. A hydrogen volume defines a reactor water level and an amount of alloy surface being wetted by water to control a rate of hydrogen generation to meet a rate of hydrogen consumption by the fuel cell stack in response to an electrical load demand. The oxygen source is provided to the fuel stack using air flow from above the water surface, a portion of submerged air suitable for human breathing, and/or dissolved oxygen recovered from the surrounding water. A potable water source is collected from the fuel cell stack when the fuel cell stack operates below the water surface and dissociates hydrogen from the hydrogen source at an anode side of the fuel cell into protons and electrons to produce an electric current. The fuel cell stack recombines the hydrogen with dissociated oxygen from the oxygen source on a cathode side by reaction in a presence of an electrolyte to produce water and heat. The fuel cell stack is cooled primarily by heat conduction paths from high temperature regions of the fuel cell stack to the water surrounding the fuel cells stack.

In some embodiments, the fuel cell stack comprises a planar fuel cell configuration having a plurality of planar cells arranged side-by-side substantially parallel to adjacent cells.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

Figures 1A, 1B:
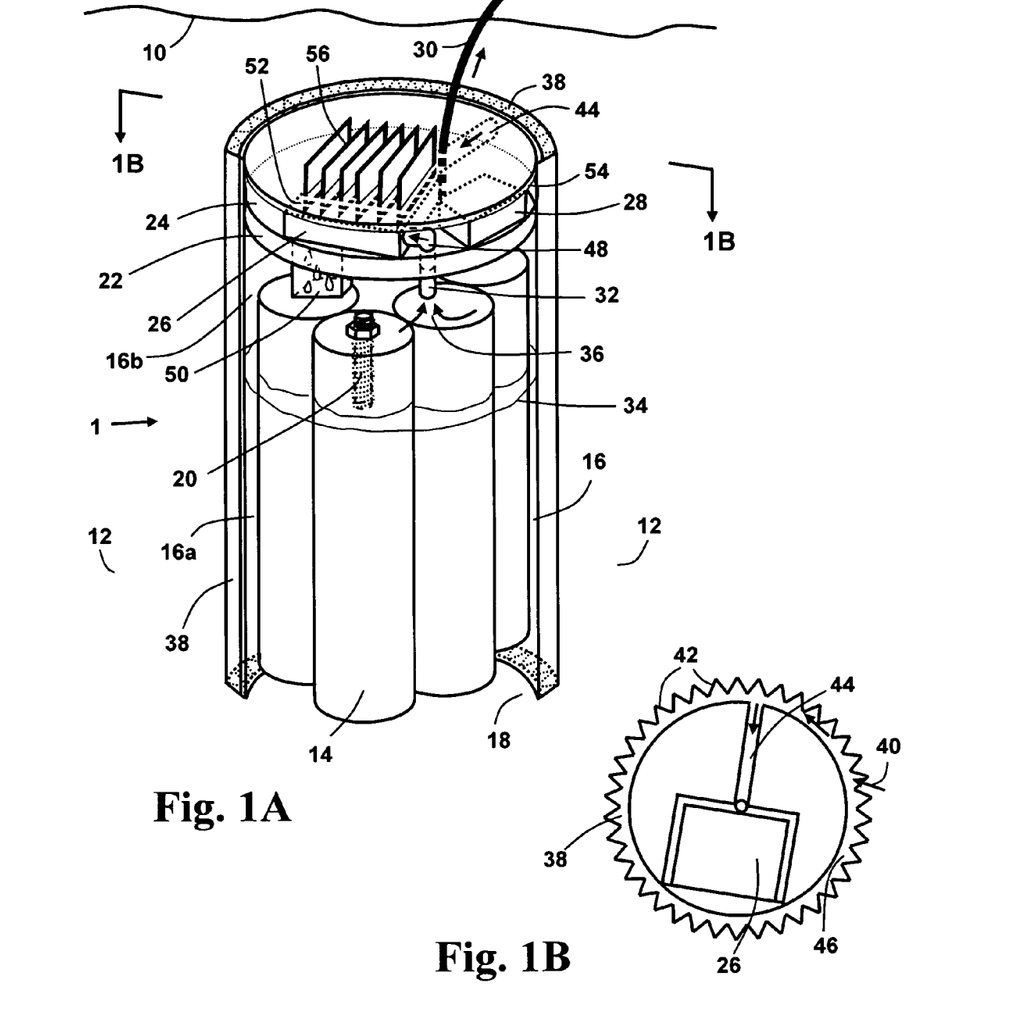
FIG. 1A is a perspective, cutaway view of an electrical power generation system in a water environment according to some embodiments of the present invention, with a hydrogen production reactor volume, water-cooled fuel cell stack, power output cable, and a gas-liquid contactor membrane for extracting oxygen from the surrounding water.
FIG. 1B is a top view of the electrical power generation reactor of FIG. 1A taken in direction 1B along line 1B-1B.

An electrical power generation system and process according to embodiments of the present invention is shown in FIG. 1A. The system reactor 1 is at least partially submerged below a surface 10 of a body of surrounding water 12.

The reactor 1 includes a metal alloy fuel 14 in a volume 16 and has a generally open bottom 18. As illustrated, the cylindrical metal alloy fuel 14, typically based on magnesium or aluminum, is suspended in the reactor volume 16. The metal alloy fuel 14 may be suspended, for example, from threaded rods 20 attached to a plate (not shown) which is held at the reactor walls or attached to a bulkhead 22 above. The reactor volume 16 includes a bottom portion 16a, which is filled with water, and a top portion 16b.

As illustrated, the bulkhead 22 separates the reactor volume 16 from a dry volume 24 which encloses the fuel cell stack 26 and integrated, solid-state electronic circuitry 28 which may be used to condition the electrical current and voltage from the fuel cell stack 26 to an electrical load (not shown) via a power cable 30. The electrical load may be above or below the surface 10 of the water 12. In some embodiments, there is sufficient volume between the metal alloy fuel 14 and a hydrogen intake 32 of the fuel cell stack 26 so that inhalation of bubbles and water by the fuel cell stack 26 is substantially prevented. In some embodiments, there is also sufficient length between the bottom of the metal alloy fuel 14 and the bottom 18 of the reactor 1 such that periodic inclinations of the reactor configuration away from its vertical axis will not result in failure from excessive gas loss. In fact, in some embodiments, the reactor process can operate through inversions and occasional inclinations of 45° or more.

Hydrogen gas is generated at the surface of the metal alloy fuel 14, which is in contact with a portion of the surrounding water 12. Examples of the hydrogen reaction are $Mg+2H_2O \rightarrow (Mg(OH)_2+H_2$ or $Al+3H_2O \rightarrow Al(OH)_3+1.5H_2$, both catalyzed by a naturally occurring salt (e.g., in sea water) such as sodium chloride, NaCl, with concentration of the salt being that which can be dissolved in the reactant water, e.g., 2%-3%. The water 12 contacts the metal alloy fuel 14 up to a variable level 34 determined by the hydrostatic pressure of the water at the depth, which is the distance between the water surface 10 and the reactor bottom 18, and by a volume of hydrogen 36 between the water level 34 and the bulkhead 22. The volume of hydrogen 36 is determined by its hydrostatic pressure and by the balance between the rate of generation of the hydrogen at the wetted surface of the metal alloy fuel 14 and the rate of consumption of the hydrogen by the fuel cell stack 26. The hydrogen consumption is based on the rate of energy demand (power demand) of an electrical load attached to the fuel cell stack 26 by a cable 30. When there is no electrical load, then generally no hydrogen is consumed by the fuel cell stack 26 and build-up of hydrogen gas 36 pressure pushes the water level 34 down. When a load is present, hydrogen is consumed by the fuel cell stack 26, gas pressure is reduced below the hydrostatic pressure, and water 12 enters the reactor 16 so that the water level 34 rises and more hydrogen is produced. At a steady state, the water level 34 is that required to produce hydrogen at the same rate as the rate of its consumption. In addition to the area of the reacting surface of the metal alloy fuel 14, the rate of hydrogen generation is controlled by the salt concentration, the concentration of alloying agents such as nickel in the metal alloy fuel 14, and the temperature at the reacting surface. These parameters may be chosen such that only a small portion of the metal alloy fuel 14 surface needs be wetted to produce sufficient hydrogen to meet the maximum demand of the fuel cell stack 26. Therefore, the water level 34 may remain near the bottom of the metal alloy 14 as it is consumed.

As illustrated in FIG. 1A-1B, oxygen is supplied to the fuel cell stack 26 by capturing oxygen dissolved in the surrounding water 12 using a gas-liquid contactor or membrane 38. The membrane 38 is a polymer, hollow micro-fiber membrane which allows oxygen gas flow via inlet 44 and in a direction 40 but does not allow the passage of water, at a rate depending on relative oxygen concentrations and pressures on either side of the membrane 38. A sufficient area of the membrane 38 can be provided for a suitable oxygen source, for example by the location of the membrane 38 outside the reactor volume 16 surface, by a pleating 42, and/or by multilayers. The consumption of the fuel cell stack oxygen flow via the inlet 44 consumption reduces oxygen partial pressure on a side 46 of the fuel cell stack 26. In some embodiments, other gases not harmful to fuel cell operation, such as nitrogen and carbon dioxide, may also pass through the membrane 38. For example, the membrane 38 can be a Liqui-Cel® Membrane Contactors from Membrana-Charlotte, a Division of Celgard LLC (Charlotte, N.C., USA).

The fuel cell stack 26 is typically of the polymer electrode membrane (PEM) type, and can have relatively low-temperature operation, fast-starting capability, all-solid-state construction, and low-maintenance operation. The fuel cell stack 26 may have cells stacked face-to-face, anode-to-cathode, or may be a planar type fuel cells configuration. For the planar type, the individual cells are side-by-side in a plane with hydrogen gas on one side and oxygen or air on the other. The planar cell may be advantageous in an underwater environment, because heat can be more directly transferred from the large area of the plane to the surrounding water, thus more efficiently cooling the fuel cells.

Hydrogen gas passes through an inlet 48 in a dead-end into the PEM fuel cell stack 26 for fast load response and steady pressure control. The fuel cell stack 26 dissociates the hydrogen sourced from the top portion 16b of the reactor 1 at an anode side into protons and electrons to produce an electric current, $H_2 \rightarrow 2H^+ + 2e^-$, and recombines the hydrogen with the oxygen flow via the inlet 44 on the cathode side by a reaction in the presence of an electrolyte to produce a clean water output via an output 50 and heat, $\frac{1}{2}O_2 + 2H^+ + 2e^- \rightarrow H_2O + (\sim 29 \text{ kcal heat})$. In some embodiments, water from the output 50 can be condensed for recovery as a potable water supply.

The fuel cell stack 26 may be cooled almost entirely by high-heat-conductivity paths 52 such as copper or aluminum contacting the fuel cell stack 26 at generally maximum temperature areas (such as near the gas inlets 44, 48 proximate to the fuel cell cathode) at one end, passing a short distance through an enclosure wall 54 for the dry volume 24, and ending (for example, in a configuration of parallel fins 56) in the surrounding water 12. The enclosure wall 54 may also be formed of a material having relatively high heat conductivity to augment fuel cell stack heat loss to the water 12. Heat from the fuel cell stack 26 can be removed at a rate that maintains temperatures within the dry enclosure 24 and on surfaces of the fuel cell stack 26 within a range preferred for the operation of PEM fuel cells, such as 60° to 90° C.

The reactor 1 shown in FIG. 1A-1B may supply electrical power to a load at or above the surface 10 or submerged in the water 12 and, in particular embodiments can be integrated into the well of a buoy, such as a communications or meteorological buoy, to supply on-board power.

As illustrated in FIG. 1A-1B, when the reactor 1 is placed in the water 12, the bottom portion 16a of the volume 16 is filled with water 12. A fuel cell stack 26 is configured to react hydrogen and oxygen to produce electricity. As illustrated, oxygen is provided by a membrane 38 in at least a portion of a wall of the reactor 1 that is configured to recover dissolved oxygen from the surrounding water 12. However, it should be understood that other oxygen sources can be used, including air flow from above the water surface 10, oxygen from a source generally suitable for breathing, such as from a cabin of a submerged, manned vehicle or an exhaust from a self-contained underwater breathing apparatus (SCUBA).

As shown, hydrogen is provided by the metal alloy fuel 14 as it reacts with the water 12. The hydrogen fills the top portion 16b of the volume 16. The metal alloy fuel 14 is at least partially submerged in the water 12 in the bottom portion 16a. The metal alloy fuel 14 is catalyzed by salt in the water 12, such as a naturally occurring sea salt in the water 12. In particular embodiments, the salt is dispersed in the metal alloy fuel 14 in an amount of not less than 3% by weight. The hydrogen gas in the top portion 16b supplies the fuel cell stack 26 at a hydrostatic pressure corresponding to a depth of the water in the bottom portion 16a, and consequently, a surface area of the metal alloy fuel 14 contacting the water 12 in the bottom portion 16a to thereby control a rate of hydrogen generation based on a rate of hydrogen consumption by the fuel cell stack 26 responsive to an electrical load demand on the fuel cell stack 26.

The fuel cell stack 26 can dissociate the hydrogen gas at an anode side thereof into protons and electrons to thereby produce an electric current. The fuel cell stack 26 can recombine the hydrogen gas with dissociated oxygen on a cathode side of the fuel cell stack 26 by a reaction in a presence of an electrolyte to produce water (via the output 50) and heat. In some embodiments, the fuel cell stack 26 is cooled by heat conduction paths from high temperature regions to water surrounding the reactor 1. For example, as illustrated, the fuel cell stack 26 is cooled by fins 56, which conduct heat from the fuel cell stack 26 to the surrounding water 12. However, other cooling techniques may be used, e.g., to conduct heat from the fuel cell stack 26 to the surrounding water.

In particular embodiments, the metal alloy fuel 14 includes a magnesium or aluminum base alloyed with nickel of more than about 0.1% and less than about 7% to provide a sufficient reaction rate to meet the hydrogen demand of the fuel cell stack 26. The metal alloy fuel 14 can be stored in air for two years or more without significant degradation of hydrogen generation capability, for example, with less than 1% degradation of hydrogen generation capability. The metal alloy fuel 14 can be provided as one or more castings, which can be removably replaced in the reactor 1. The castings can be configured to provide a sufficient reaction surface area to provide hydrogen to meet the hydrogen demand of the fuel cell stack 26 without significant loss of hydrogen out of the reactor 1, for example, to provide hydrogen to meet a fuel cell stack hydrogen without more than 5% loss of hydrogen to the surrounding water.

As shown, the volume of hydrogen gas in the reactor 1 (i.e., in the top portion 16b) provides sufficient space above the metal alloy fuel 14 to substantially prevent water entrainment and gas/water bubble transport to the fuel cell stack 26 and also provides sufficient space below the metal alloy fuel 14 to substantially inhibit a loss of hydrogen from the bottom portion 16a. In some embodiments, the total buoyancy of the reactor 1 varies by less than about 40% during a complete reaction of the metal alloy fuel 14.

Figures 2A, 2B:
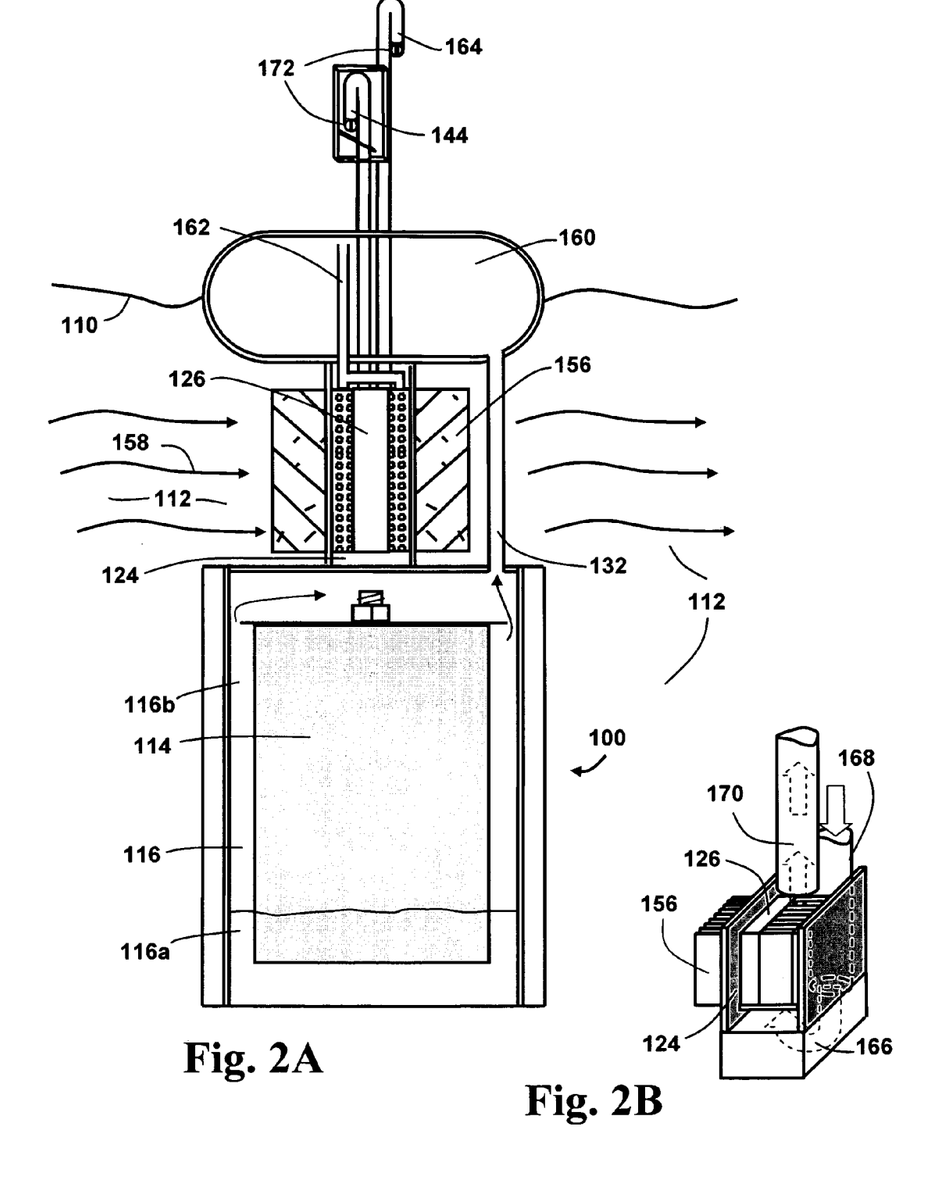
FIG. 2A is a side, cutaway view of an electrical power generation system in a water environment according to some embodiments of the present invention with hydrogen reactor, water-cooled fuel cell stack, integrated, rigid flotation volume, and free-convection intake from and exhaust to the atmosphere above the water surface.
FIG. 2B is an enlarged partial perspective view of the fuel cell stack, heat conduction paths, and a portion of the reactor volume of the power generation system of FIG. 2A.

FIGS. 2A-2B illustrate another example of an electrical power generation process and system according to some embodiments of the present invention. The reactor 100 includes a hydrogen generation reaction volume 116 having a bottom portion 116a and a top portion 116b with a single solid cylinder of the metal alloy 114 and a dry volume 124 for a water-cooled fuel cell stack 126. The fuel cell stack 126 is cooled by vertical, parallel fins 156, which transfer heat from the fuel cell stack 126 to the surrounding water 112. The movement according to arrows 158 of the surrounding water 112 relative to the power generation reactor 100, such as that induced by wind or water currents, may improve heat removal and fuel cell stack 126 and/or moderate a temperature control. The movement of the water 112 may also increase a flow of oxygen through a contactor membrane, such as the membrane 38 described in FIGS. 1A-1B.

As illustrated in FIGS. 2A-2B, a rigid volume enclosure 160 is built into the reactor 100. The reactor 100 includes a first hydrogen intake tube 132 and a second hydrogen intake tube 162. The hydrogen gas is stored in the enclosure 160, which provides buoyancy for flotation of the reactor 100 near the surface 110. In some embodiments, the enclosure 160 can be used to provide buoyancy for a person or persons in an emergency or for objects for which buoyancy may be desired. The enclosure 160 may also act as an accumulator to substantially prevent water (which may rise in a first hydrogen intake tube 132) from being inhaled into the fuel cell stack 126 through the second hydrogen intake tube 162.

Oxygen is supplied to the fuel cell stack 126 as air through an intake port 144 and transported to the fuel cell stack 126 by free convection. The oxygen is partially consumed by the fuel cell stack 126, which reduces the gas mass and increases its temperature, and promotes gas exhaust out through an exhaust port 164. Sufficient excess air may be provided, e.g., on the order of one standard liter per minute for 8 watts of power produced by the fuel cell stack 126. As shown in FIG. 2B, a chimney effect flow 166 can be used to increase air flow, with an inlet air flow 168 entering the dry enclosure 124 below the hot fuel cell stack 126 which is mounted vertically to increase the heat transfer promotion of air convection to an exhaust 170.

The intake port 144 and exhaust port 164 for air can be protected from water droplet ingress, e.g., by orienting the openings downward to avoid precipitation ingress and incorporating float valves (e.g., snorkel valves 172), which substantially prevent water from entering from below in heavy weather and wave conditions. Breathable, water repellent filters of specialized polymer materials may also be included to prevent water entering the dry enclosure 124.

Figure 3:
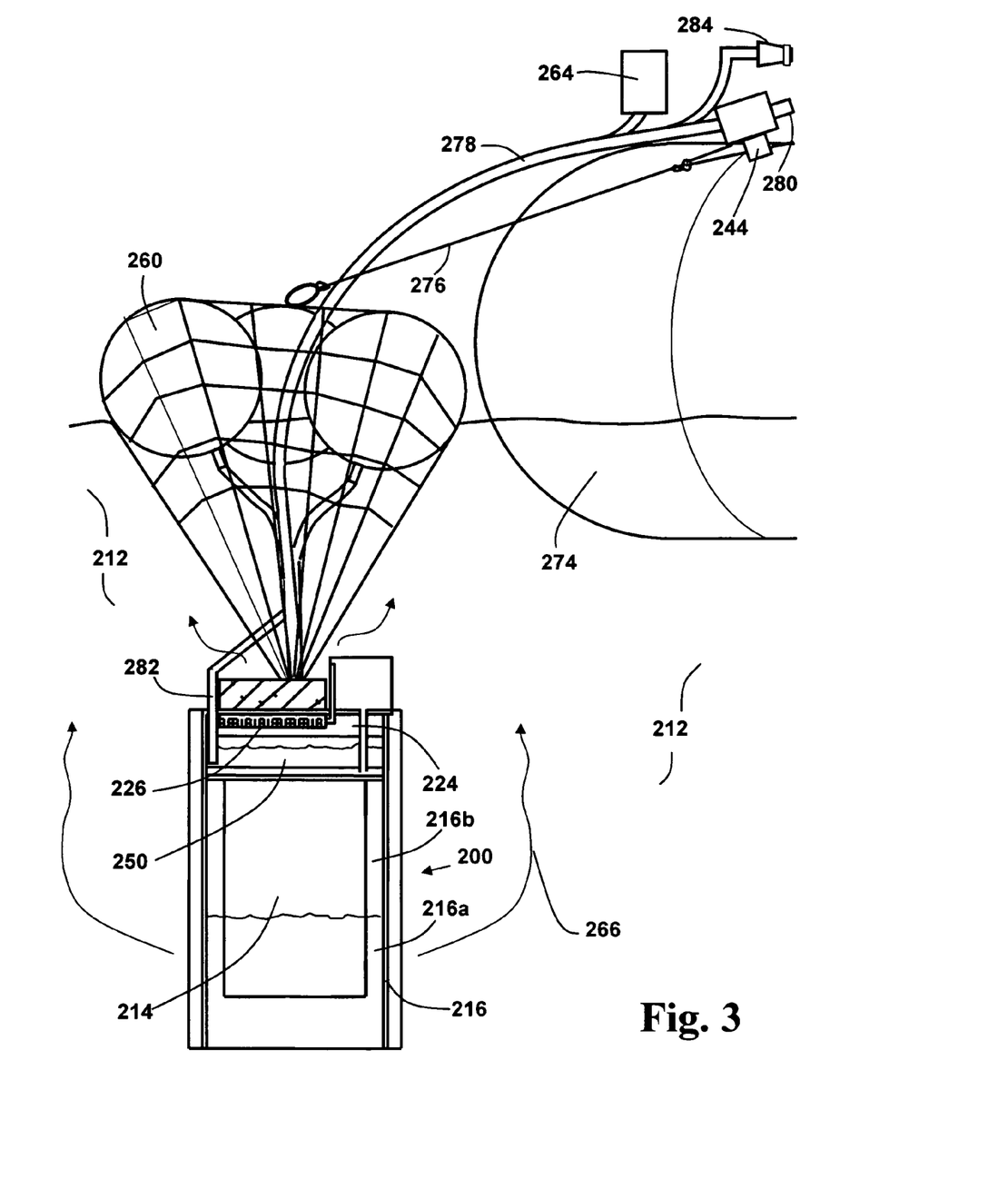
FIG. 3 is a side, partial cutaway view of an electrical power generation system in a water environment according to some embodiments of the present invention with a hydrogen reactor, a fuel cell stack, an expandable, segmented flotation volume, and an oxygen supply by both natural convection and breathing exhaust airways connected along with the power output cable to a floating platform.

FIG. 3 illustrates a reactor system 200 according to some embodiments of the present invention that includes a hydrogen generation reaction volume 216 with a bottom portion 216a filled with water and a top portion 216b filled with hydrogen and with a single solid cylinder of the metal alloy fuel 214 and a dry volume 224 for a water-cooled fuel cell stack 226.

In FIG. 3, floatation devices 260 are provided by segregated, expandable volumes or balloons which can be stored in a deflated or collapsed state when not in use. The flotation devices 260 store hydrogen or air purged from the hydrogen reactor volume 216 and can be capable of supporting a person or persons in the water 212. It can be noted that a heat flow 266 rejected to the water 212 by both the metal alloy fuel 214 reaction and the fuel cell stack 226 may be available to warm a person using the flotation.

The power reactor 200 is also shown tethered to a floating platform 274 such as a dinghy by a connection line 276 or by a composite multi-functional connection line or cable 278 which includes an air intake 244 for free convection to the fuel cell stack 226, an exhaust 264 of reduced-oxygen air, and an exhalation mouthpiece 280 and tube for a person to send lung exhaust to the fuel cell stack 226. Resting tidal volume for the lungs is typically 6.5 liters of air per minute and oxygen is reduced only less than 20% below its concentration in air. Accordingly, the exhalation mouthpiece can be used to provide an oxygen source to the fuel cell stack 226. The intake 244, exhaust 264 and exhalation ports 280 may be protected from water entry, e.g., using an orientation of the openings thereof or suitable valves, such as is described with respect to the ports 144, 164 of FIGS. 2A-2B.

FIG. 3 also illustrates a configuration for capturing the potable water 250 that is condensed and recovered as a product from the hydrogen-oxygen reaction in the fuel cell stack 226. This water 250 can be accessed through a tube 282 using the mouth and/or a pump suction 284 or by lifting the reactor 200 up to the surface and opening an access valve (not shown).

Figure 4:
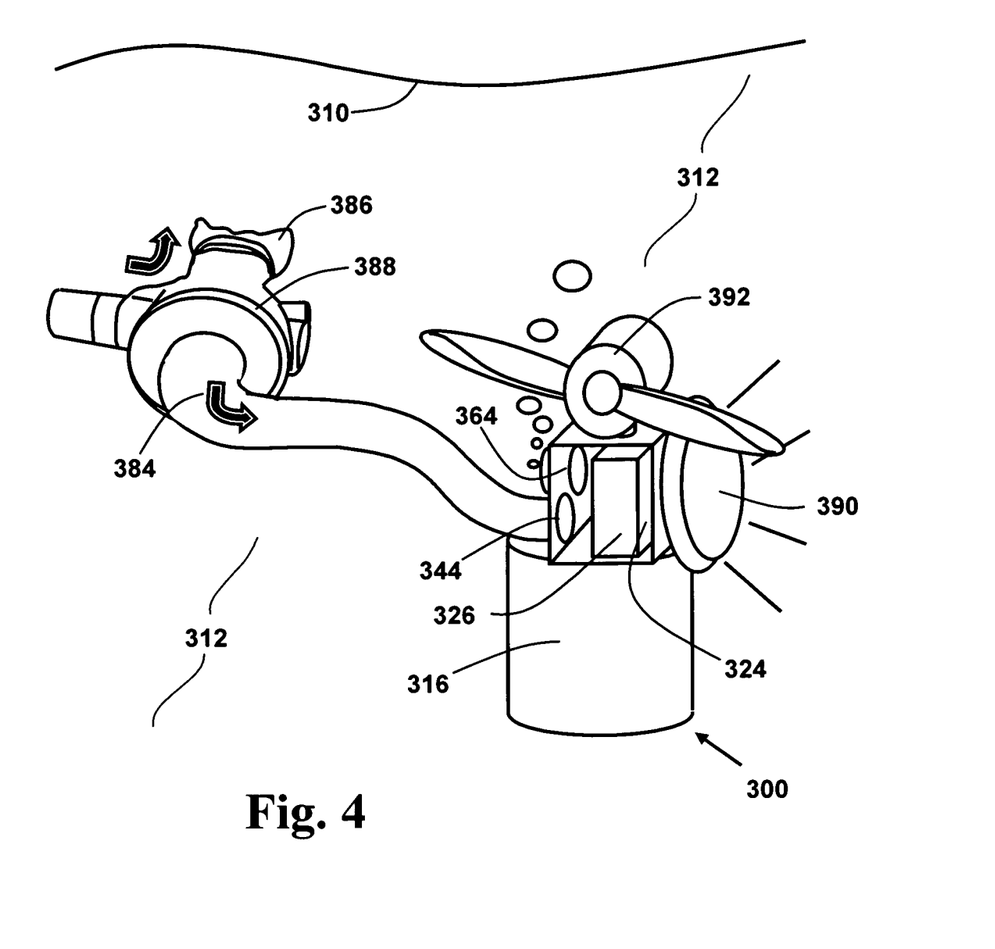
FIG. 4 is a perspective view of an electrical power generation system in a water environment according to some embodiments of the present invention with a hydrogen reactor, a water-cooled fuel cell stack, an oxygen supply from the exhaust of a self-contained underwater breathing apparatus, and a lamp and a propeller as exemplary power loads, in an integrated unit.

FIG. 4 illustrates another exemplary system 300 for use under the water surface 310. The system 300 operating in the water 312 environment includes the outer wall of the hydrogen reactor volume 316 and a cutaway view of a water-cooled fuel cell stack 326 in a dry enclosure 324 with air inlet 344 and outlet 364. The air is supplied to the fuel cell stack 326 from an exhaust 384 from a self-contained underwater breathing apparatus (SCUBA) including a diver's mouthpiece 386 and regulator 388. The exhaust from the dry enclosure 364 may be regulated to maintain an enclosure pressure slightly above the hydrostatic pressure at diving depth. Also shown are a light source or lamp 390 and a propeller 392, which may be powered by the fuel cell stack 326. It should be understood that other devices may be powered by the fuel cell stack 326.

Power generation systems according to embodiments of the present invention can be implemented in a variety of environments. For example, systems according to certain embodiments of the present invention can be used to provide power to a submerged, manned underwater vehicle. In particular embodiments, air from the cabin of the vehicle can be used to circulate past a fuel cell stack using free convection or a pressure differential normally available in the vessel's air system.

Embodiments according to the present invention can provide a reactor for producing electrical power in water environments. Process designs as described herein may increase the energy and power density of the electrical production. Embodiments of the present invention may be relatively simple to implement, reliable, safely operated, and can be provided at relatively low cost. Some embodiments may exhibit easy deployment and refueling of a reactor in the water environment. Operation of the systems described herein may be generally impervious to weather conditions, the time of day or the time of year. A reactor can be applied, for example, to personal flotation, watercraft, platforms dinghies, lifeboats, buoys, submerged habitats or vehicles, diving apparatus, and/or for emergency situations. A reactor can serve such functions as powering sensors, battery charging, auxiliary lighting, communications and signaling, propulsion, powering tools, winches and other mechanical functions, providing backup power, and heating and cooling.

Hydrogen and oxygen can be sourced to a fuel cell stack as described herein for producing electricity. In some embodiments, hydrogen is produced by a submerged reaction of a metal alloy with water aided by catalysis by a naturally occurring salt, such as can be present in naturally occurring sea salt. The reaction takes places in a reactor volume partially open to the water environment, such that relative rates of hydrogen generation and consumption and the hydrostatic pressure at the reactor inlet determine the hydrogen gas volume and the water level in the reactor. The amount of wetted metal alloy reaction surface and the production of hydrogen may be thus passively controlled by the gas demand by the fuel cell stack, which is in proportion to the electrical load demand on the fuel cell stack. The solid reactant or metal alloy is typically magnesium or aluminum alloyed with nickel, and the metal alloy can be cast in the form of a bar(s) or cylinder(s) which is easily installed and suspended in the reactor volume. The reactor design may substantially prevent water entrainment into the hydrogen transferred to the fuel cell. The hydrogen is provided to the fuel cell at the described, e.g., using hydrostatic pressure.

Oxygen may be supplied by various techniques, for example, depending upon the nature of the application of the electrical power being generated. In some embodiments, oxygen may be provided by a natural convection of air from above the surface of the body of water. This natural convection can take advantage of the "chimney effect" produced by the heat generated by the fuel cell stack, to the extent that an excess of oxygen required by the fuel cell is provided. It can be noted that increased power demand results in increased fuel cell heat and thus more oxygen flow to meet demand. Oxygen may also be all or partially supplied by exhaling of breath from person(s) at the water surface in a location to which the power process is tethered or connected. Oxygen may also be all or partially supplied by supplying air cooling to the fuel cell stack.

In some embodiments, oxygen may be supplied from beneath the surface of the surrounding water by an oxygen source normally available for breathing, such as the cabin air in an occupied submersible vehicle or habitat, or the exhaust from a diver's breathing regulator. Oxygen may also be supplied by a hydrophobic microporous hollow fiber membrane (such as those based on poly-4-methyl-1-pentene), i.e., a gas-liquid contactor, which allows gas but not liquid to pass through. Accordingly, the reactor can recover dissolved oxygen from the surrounding water while utilizing an internal process vacuum induced by oxygen consumption of the fuel cell stack. A large contact area and refreshment of water by movement at the contactor face may address the low concentrations of dissolved oxygen in water under natural conditions. Heat from the fuel cell stack and from the metal alloy reactor with the water may be used to improve the rate of migration of oxygen through the contactor.

Techniques described herein for generating and transferring hydrogen and oxygen can avoid the addition to the reactor of bulky gas tanks and active pressure and flow control means. In some embodiments, no additional solid or liquid oxygen source is needed for chemically supplying oxygen. For the oxygen and hydrogen supplies, passive float or relief valves, accumulator volumes or other similar mechanisms are applied to substantially prevent water droplet ingestion by the fuel cell stack.

The fuel cell stack within the electrical power generating process can operate below the surface of the water environment so that a heat transfer path from the fuel cell stack to the surrounding water environment provides the cooling for the fuel stack as described herein. In this configuration, pumps and fans may not be needed for cooling fuel cell stacks. The fuel cell stack(s) may be of the polymer electrolyte membrane (PEM) type, which operate at relatively low temperatures (e.g., les than 90° C.) and pressure and efficiencies near 50% based on the conversion of hydrogen energy at the lower heating value.

Embodiments according to the present invention may produce reserves of gas and potable water which can be used for flotation and for drinking, respectively. Potable water and/or reserves of gas may be utilized, for example, as part of an emergency and rescue package in a water environment. The proposed reactor may be secured to any electrical power utilization platform or user either at the surface of the water or submerged. The reactor attachment or connection line can be a tether which may include a strong attachment cord, electrical power transference wiring, and oxygen transfer, and/or the power usage application(s) may be integrated into the structure of the power generation process.

Embodiments according to the present invention provide a combined process/reactor system which includes a reactive metal alloy in a cast, monolithic form, e.g., for optimized reaction rate and replacement in the system, containment and control of the reactions below the water surface without use of hydrogen-producing solid hydrides, system submergence to generally avoid effects of surface weather and wave conditions, mechanisms for eliminating water in the hydrogen supplied to the fuel cell stack, passive flow and pressure control to improve process reliability, oxygen supply without a pressurized or chemical reaction source added to the application, cooling of a fuel cell stack by a direct contact path to the surrounding water environment, hydrogen supply on demand to the fuel cell by limiting the water reaction without actively controlling water flow, process buoyancy control using reactant metal and reaction volume design, flotation provided by gas from the reaction volume, recovery of potable water from the fuel cell stack operation, and capability for use with personal flotation, watercraft, dinghies, platforms, buoys, submerged habitats or vehicles, and diving apparatus.

Embodiments of the present invention can provide advantages over other competing marine electrical power sources such as engine/generator sets, batteries, and rechargeable batteries combined with photovoltaic solar panels, wind energy harvesting, and wave energy harvesting. Compared to embodiments of the present invention described herein, engine/generator sets using petroleum-based fuels may have slightly higher power and energy densities (power/unit mass, energy stored/unit mass), but typically cannot operate when submerged, should not be operated unattended (e.g., are not truly remote), have relatively low reliability, are susceptible to weather, are polluting, are hazardous to operate, are very noisy and hot, and are not easily deployed from one location to another. With respect to batteries, energy and power densities are 15 to 100 times lower than as can be achieved using some embodiments according to the invention, the costs may be projected to be 10 times higher or more, and recharging times can be 5 times to 50 times longer than the times projected for replacing the metal alloy fuel according to embodiments of the present invention. Photovoltaic solar panels, wind energy harvesting, and wave energy harvesting add similar weight, volume and cost disadvantages as do batteries, and their operation and even failure are highly dependent on weather and the time of day, they may not operate submerged, they may not offer energy storage without batteries, they may have very low efficiencies, they may be difficult to deploy, and the mechanical nature of the wind and wave systems may make them unreliable.

In addition, the power system described herein can have a dormant shelf life of two or more years without sealing or substantial loss of energy storage, can provide power on demand without active controls, employs the high energy conversion efficiency of fuel cells, and does not use hydride compounds which react by difficult-to-control hydrolysis, and which present storage problems and high-temperature/explosion hazards. Also, in comparison with other hydrogen-oxygen-fuel cell systems, embodiments according to the invention may avoid high-pressure hydrogen and oxygen storage tanks with regulators which may have energy densities of 25 to 100 times lower and may cost about 5 times higher. Embodiments of the present invention require no finely divided materials, no stirring, no electrolysis for gas production and do not scavenge electrical power from the fuel cell for operating the system.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A power generating system for operating below a surface of a body of water, the system comprising:
   a fuel cell stack configured to react hydrogen and oxygen to produce electricity;
   an oxygen source configured to provide oxygen to the fuel cell stack; and
   a hydrogen source configured to provide hydrogen to the fuel cell stack;
   wherein the hydrogen source is at least partially submerged in water and incorporates a non-hydride metal alloy comprising a magnesium or aluminum base alloyed with nickel that reacts with water to produce hydrogen from the water, the reaction being catalyzed by sodium chloride in the water, and the metal alloy is contained in a reactor volume that allows unassisted entry of surrounding water, such that hydrogen gas produced in the reactor volume supplies the fuel cell stack at a hydrostatic pressure representing a depth of water contacting the metal alloy, a hydrogen volume defining a reactor water level and an amount of alloy surface being wetted by water, thereby controlling a rate of hydrogen generation to meet a rate of hydrogen consumption by the fuel cell stack in response to an electrical load demand;
   wherein the oxygen source provides oxygen to the fuel cell stack below the surface and comprises air flow from above the water surface, a portion of submerged air suitable for human breathing, and/or dissolved oxygen recovered from the surrounding water;
   wherein the fuel cell stack operates below the water surface and dissociates hydrogen from the hydrogen source at an anode side of the fuel cell stack into protons and electrons to produce an electric current, and the fuel cell stack recombines the hydrogen with dissociated oxygen from the oxygen source on a cathode side by reaction in a presence of an electrolyte, thereby producing water and heat; and
   wherein the fuel cell stack is cooled by heat conduction paths from high temperature regions of the fuel cell stack to the water surrounding the system.

2. The system of claim 1 wherein the metal alloy includes a magnesium or aluminum base alloyed with nickel of more than 0.1% and less than 7% to provide a sufficient reaction rate to meet a fuel cell stack hydrogen demand.

3. The system of claim 1 wherein the metal alloy is storable in air for more than two years with less than 1% degradation of hydrogen generation capability.

4. The system of claim 1 wherein the metal alloy comprises one or more castings, each casting being removably replaceable.

5. The system of claim 4, wherein the castings are configured to provide a sufficient reaction surface area to provide hydrogen to meet a fuel cell stack hydrogen demand without more than 5% loss of hydrogen to the surrounding water.

6. The system of claim 1 wherein the hydrogen volume provides sufficient space above the metal alloy to substantially prevent water entrainment and gas/water bubbles transport to the fuel cell stack, and wherein the hydrogen volume provides sufficient space below the metal alloy to substantially inhibit a loss of hydrogen to the surrounding water.

7. The system of claim 1 wherein the sodium chloride is a catalyzing salt that is dispersed in the metal alloy in an amount of not less than 3% by weight.

8. The system of claim 1 wherein the system is configured such that the total buoyancy of the system varies by less than about 40% during a complete reaction of the metal alloy.

9. A power generating system for operating below a surface of a body of water, the system comprising:
   a fuel cell stack configured to react hydrogen and oxygen to produce electricity;
   an oxygen source configured to provide oxygen to the fuel cell stack; and
   a hydrogen source configured to provide hydrogen to the fuel cell stack;
   wherein the hydrogen source is at least partially submerged in water and incorporates a non-hydride metal alloy comprising a magnesium or aluminum base alloyed with nickel that reacts with water to produce hydrogen from the water, the reaction being catalyzed by sodium chloride in the water, and the metal alloy is contained in a reactor volume that allows unassisted entry of surrounding water, such that hydrogen gas produced in the reactor volume supplies the fuel cell stack at a hydrostatic pressure representing a depth of water contacting the metal alloy, a hydrogen volume defining a reactor water level and an amount of alloy surface being wetted by water, thereby controlling a rate of hydrogen generation to meet a rate of hydrogen consumption by the fuel cell stack in response to an electrical load demand;
   wherein the oxygen source provides oxygen to the fuel cell stack below the surface and comprises air flow from above the water surface, a portion of submerged air suitable for human breathing, and/or dissolved oxygen recovered from the surrounding water;
   wherein the fuel cell stack operates below the water surface and dissociates hydrogen from the hydrogen source at an anode side of the fuel cell stack into protons and electrons to produce an electric current, and the fuel cell stack recombines the hydrogen with dissociated oxygen from the oxygen source on a cathode side by reaction in a presence of an electrolyte, thereby producing water and heat; and
   wherein the fuel cell stack is cooled by heat conduction paths from high temperature regions of the fuel cell stack to the water surrounding the system,
   wherein a portion of the hydrogen produced or separate air forced from the reactor volume by immersion in the water, is stored in a flotation volume to thereby increase a buoyancy in the water.

10. The system of claim 1 wherein the oxygen source is configured to provide air to the fuel cell stack by free convection induced by heat from the fuel cell stack, the system further comprising a filter and/or float valve configured to substantially prevent water from entering the fuel cell stack.

11. The system of claim 1 wherein the oxygen source is configured to provide air to the fuel cell stack from lung exhaust from a person breathing, the system further comprising a filter, float valve and/or relief valve configured to substantially prevent water from entering the fuel cell stack.

12. The system of claim 1 wherein the oxygen source is configured to provide air to the fuel cell stack from a portion of air also available for breathing by persons submerged below the water surface.

13. The system of claim 12, wherein the oxygen source includes lung exhaust from a self contained underwater breathing apparatus (SCUBA).

14. The system of claim 1 wherein the oxygen source is configured to provide oxygen to the fuel cell stack using a hydrophobic microporous hollow fiber membrane or a gas-liquid contactor which allows gas but not liquid to pass through, to recover dissolved oxygen from the surrounding water while utilizing an internal process vacuum induced by oxygen consumption of the fuel cell stack.

15. The system of claim 1 wherein the oxygen source is configured to move air to the fuel cell stack using a means for cooling the fuel cell stack supplemental to a cooling provided by the surrounding water, the system further comprising a filter and/or float valve for preventing water droplets from entering to the fuel cell stack.

16. The system of claim 1 wherein the fuel cell stack includes a hydrogen gas channel inlet, oxygen and/or air gas channel inlets and a plurality of fuel cells that include a proton-conducting polymer electrolyte membrane between the anode side and the cathode side, with hydrogen and oxygen reactions at catalyst surfaces, and with heat transfer provided near the gas channel inlets.

17. The system of claim 1 wherein the fuel cell stack outputs a potable water product.

18. A power generating system for operating below a surface of a body of water, the system comprising:
a fuel cell stack configured to react hydrogen and oxygen to produce electricity;
an oxygen source configured to provide oxygen to the fuel cell stack; and
a hydrogen source configured to provide hydrogen to the fuel cell stack;
wherein the hydrogen source is at least partially submerged in water and incorporates a non-hydride metal alloy comprising a magnesium or aluminum base alloyed with nickel that reacts with water to produce hydrogen from the water, the reaction being catalyzed by sodium chloride in the water, and the metal alloy is contained in a reactor volume that allows unassisted entry of surrounding water, such that hydrogen gas produced in the reactor volume supplies the fuel cell stack at a hydrostatic pressure representing a depth of water contacting the metal alloy, a hydrogen volume defining a reactor water level and an amount of alloy surface being wetted by water, thereby controlling a rate of hydrogen generation to meet a rate of hydrogen consumption by the fuel cell stack in response to an electrical load demand;
wherein the oxygen source provides oxygen to the fuel cell stack below the surface and comprises air flow from above the water surface, a portion of submerged air suitable for human breathing, and/or dissolved oxygen recovered from the surrounding water;
wherein the fuel cell stack operates below the water surface and dissociates hydrogen from the hydrogen source at an anode side of the fuel cell stack into protons and electrons to produce an electric current, and the fuel cell stack recombines the hydrogen with dissociated oxygen from the oxygen source on a cathode side by reaction in a presence of an electrolyte, thereby producing water and heat; and
wherein the fuel cell stack is cooled by heat conduction paths from high temperature regions of the fuel cell stack to the water surrounding the system,
wherein hydrogen and oxygen are provided to the fuel cell stack in the absence of active pressure or flow controls, valves and/or regulators.

19. The system of claim 1 further comprising a floating buoy structure.

20. The system of claim 1, wherein the system is connected to a submerged application platform or user.

21. The system of claim 1, further comprising a connection line that is configured to transport gas and/or liquid to and/or from the system.

22. The system of claim 1, wherein heat from the fuel cell stack and/or from the metal alloy is transferred to the surrounding water and is utilized for warming a person in the water, for attracting fish in cold water, for inducing mechanical motion, and/or for warming to increase oxygen migration through the hydrophobic microporous hollow fiber membrane.

23. The system of claim 1, wherein the water is sea water and the sodium chloride in the water is a naturally occurring sea salt.

24. The system of claim 1, wherein the fuel cell stack comprises a planar fuel cell configuration having a plurality of planar cells arranged side-by-side substantially parallel to adjacent cells.

25. A power generating method for operating below a surface of a body of water using a system having a fuel cell stack configured to react hydrogen and oxygen to produce electricity, an oxygen source configured to provide oxygen to the fuel cell stack, and a hydrogen source configured to provide hydrogen to the fuel cell stack, the method comprising:
submerging the hydrogen source at least partially in water;
reacting the hydrogen source comprising a non-hydride metal alloy comprising a magnesium or aluminum base alloyed with nickel with water to produce hydrogen from the water, the reaction being catalyzed by sodium chloride, wherein the metal alloy is contained in a reactor volume that allows unassisted entry of surrounding water, such that hydrogen gas produced in the reactor volume supplies the fuel cell stack at a hydrostatic pressure representing a depth of water contacting the metal alloy, a hydrogen volume defining a reactor water level and an amount of alloy surface being wetted by water, thereby controlling a rate of hydrogen generation to meet a rate of hydrogen consumption by the fuel cell stack in response to an electrical load demand;
providing the oxygen source to the fuel stack using air flow from above the water surface, a portion of submerged air suitable for human breathing, and/or dissolved oxygen recovered from the surrounding water;
collecting a potable water source from the fuel cell stack when the fuel cell stack operates below the water surface and dissociates hydrogen from the hydrogen source at an anode side of the fuel cell into protons and electrons to produce an electric current, and the fuel cell stack recombines the hydrogen with dissociated oxygen from the oxygen source on a cathode side by reaction in a presence of an electrolyte, thereby producing water and heat; and
cooling the fuel cell stack primarily by heat conduction paths from high temperature regions of the fuel cell stack to the water surrounding the fuel cells stack.

26. The method of claim 25, wherein the fuel cell stack comprises a planar fuel cell configuration having a plurality of planar cells arranged side-by-side substantially parallel to adjacent cells.

* * * * *